US012488536B2

(12) United States Patent
Schaefer et al.

(10) Patent No.: US 12,488,536 B2
(45) Date of Patent: Dec. 2, 2025

(54) SYSTEMS AND METHODS FOR ESTIMATING LANE ELEVATION FOR GENERATING 3D MAPS

(71) Applicant: Woven by Toyota, Inc., Tokyo (JP)

(72) Inventors: Alexander Christoph Schaefer, Fremont, CA (US); Shunsho Kaku, Mountain View, CA (US)

(73) Assignee: Woven by Toyota, Inc., Tokyo (JP)

( * ) Notice: Subject to any disclaimer, the term of this patent is extended or adjusted under 35 U.S.C. 154(b) by 160 days.

(21) Appl. No.: 18/198,429

(22) Filed: May 17, 2023

(65) Prior Publication Data

US 2024/0386670 A1 Nov. 21, 2024

(51) Int. Cl.
*G06T 17/05* (2011.01)
*G06T 7/70* (2017.01)
*G06V 20/56* (2022.01)

(52) U.S. Cl.
CPC .............. *G06T 17/05* (2013.01); *G06T 7/70* (2017.01); *G06V 20/588* (2022.01); *G06T 2207/30256* (2013.01)

(58) Field of Classification Search
CPC .......... G06T 7/70; G06T 17/05; G06V 20/588
USPC ....................................................... 345/419
See application file for complete search history.

(56) References Cited

U.S. PATENT DOCUMENTS 10,845,202 B1   11/2020  Urmson et al.
11,580,649 B1*   2/2023  Stojiljkovic ............. G06T 7/33
2010/0217512 A1   8/2010  Vu et al.
2014/0334668 A1  11/2014  Saund
2020/0386544 A1  12/2020  Blair et al.
2021/0201145 A1*  7/2021  Pham ....................... G06N 3/08

(Continued)

FOREIGN PATENT DOCUMENTS

CN   109583313 A    4/2019
CN   111801636 A   10/2020
CN   111950498 A   11/2020

(Continued)

OTHER PUBLICATIONS

Xu et al., "RCLane: Relay Chain Prediction for Lane Detection," ECCV 2022, Lecture Notes in Computer Science, vol. 13698, pp. 461-477.

*Primary Examiner* — Samantha (Yuehan) Wang (74) *Attorney, Agent, or Firm* — Christopher G. Darrow; Darrow Mustafa, PC (57) ABSTRACT

System, methods, and other embodiments described herein relate to estimating lane elevation using headings for generating three-dimensional (3D) maps. In one embodiment, a method includes augmenting positions of detected lane boundaries with headings of a vehicle from sensor data. The method also includes adding the headings to vertices of two-dimensional (2D) lines using direction vectors between the vertices, wherein the 2D lines are directed towards the detected lane boundaries. The method also includes estimating elevations of the vertices including surrounding lane boundaries using a weighted average and vehicle poses from the sensor data, the surrounding lane boundaries having locations different than the positions and the weighted average factors directional differences between the vertices. The method also includes generating a 3D map of driving lanes having stacked roads identified using the elevations.

20 Claims, 7 Drawing Sheets

(56) References Cited

U.S. PATENT DOCUMENTS

2024/0317254 A1* 9/2024 Tran .................. G06V 20/588

FOREIGN PATENT DOCUMENTS

| | | |
|---|---|---|
| EP | 4136570 A1 | 2/2023 |
| KR | 20190069384 A | 6/2019 |
| WO | 2021209981 A1 | 10/2021 |

* cited by examiner

SYSTEMS AND METHODS FOR ESTIMATING LANE ELEVATION FOR GENERATING 3D MAPS

TECHNICAL FIELD

The subject matter described herein relates, in general, to estimating lane elevation for maps, and, more particularly, to estimating lane elevation using headings for generating three-dimensional (3D) maps.

BACKGROUND

Vehicles may be equipped with sensors that generate data for perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. The vehicle can also augment sensor data with camera images of the surrounding environment for detecting objects. This sensor data can be useful in various circumstances for improving perceptions of the surrounding environment so that systems such as automated driving systems (ADS) can perceive the noted aspects and accurately plan and navigate accordingly. However, the ADS planning a vehicle course relies upon accurate maps that are sometimes unavailable.

In various implementations, a system producing maps using perceptual inferences lacks elevation information for lanes that is precise and accurate along three-dimensional (3D) geometries. For example, the system produces useful maps when elevation information is incorporated within a context pipeline for mapping. Still, incorporating such data can increase pipeline complexity and computation costs. Furthermore, the system produces accurate maps of lanes with elevation through manual inputs, particularly involving roadways that vertically cross (e.g., overpasses, underpasses, etc.). However, manual inputs may limit maps to two-dimensional (2D) geometries. Accordingly, generating 3D maps having accurate elevation information involves increased system complexity and costs.

SUMMARY

In one embodiment, example systems and methods relate to estimating lane elevation using headings for generating three-dimensional (3D) maps. In various implementations, systems generating maps having accurate elevation information for roads encounter difficulties from varying geometries and insufficient sensor data. As such, safety is decreased for vehicles utilizing the maps, particularly with automated vehicles that rely upon well-defined road geometries. Furthermore, annotating map data with elevation information manually increases costs and a risk that the map data will become stale. Therefore, in one embodiment, an estimation system infers elevation for driving lanes on two-dimensional (2D) maps from sensor data (e.g., images, fleet data, etc.) without manual annotation. In particular, the estimation system may add headings to detected lane boundaries and vertices of 2D lines associated with the driving lanes. In one approach, the system estimates elevations of the vertices using a weighted average including data from surrounding lane boundaries for other vehicles. Here, the surrounding lane boundaries have locations different than positions associated with the detected lane boundaries. Furthermore, the weighted average factors directional differences between the vertices for selecting elevation values that are valid. In this way, the estimation system generates a 3D map of the driving lanes using the elevations while accounting for complexities such as stacked roads (e.g., overpasses, underpasses, double-decker bridges, ramps, etc.). Accordingly, the estimation system generates the 3D map with accurate elevations for the driving lanes without manual annotations, thereby reducing costs and complexity.

In one embodiment, an estimation system 170 that estimates lane elevation using headings for generating 3D maps is disclosed. The estimation system includes memory that stores instructions that, when executed by a processor, cause the processor to augment positions of detected lane boundaries with headings of a vehicle from sensor data. The instructions also include instructions to add the headings to vertices of 2D lines using direction vectors between the vertices, wherein the 2D lines are directed towards the detected lane boundaries. The instructions also include instructions to estimate elevations of the vertices including surrounding lane boundaries using a weighted average and vehicle poses from the sensor data, the surrounding lane boundaries having locations different than the positions and the weighted average factors directional differences between the vertices. The instructions also include instructions to generate a 3D map of driving lanes having stacked roads identified using the elevations.

In one embodiment, a non-transitory computer-readable medium for estimating lane elevation using headings for generating 3D maps and including instructions that when executed by a processor cause the processor to perform one or more functions is disclosed. The instructions include instructions to augment positions of detected lane boundaries with headings of a vehicle from sensor data. The instructions also include instructions to add the headings to vertices of 2D lines using direction vectors between the vertices, wherein the 2D lines are directed towards the detected lane boundaries. The instructions also include instructions to estimate elevations of the vertices including surrounding lane boundaries using a weighted average and using vehicle poses from the sensor data, the surrounding lane boundaries having locations different than the positions and the weighted average factors directional differences between the vertices. The instructions also include instructions to generate a 3D map of driving lanes having stacked roads identified using the elevations.

In one embodiment, a method for estimating lane elevation using headings for generating 3D maps is disclosed. In one embodiment, the method includes augmenting positions of detected lane boundaries with headings of a vehicle from sensor data. The method also includes adding the headings to vertices of 2D lines using direction vectors between the vertices, wherein the 2D lines are directed towards the detected lane boundaries. The method also includes estimating elevations of the vertices including surrounding lane boundaries using a weighted average and vehicle poses from the sensor data, the surrounding lane boundaries having locations different than the positions and the weighted average factors directional differences between the vertices. The method also includes generating a 3D map of driving lanes having stacked roads identified using the elevations.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with estimating lane elevation using headings for generating three-dimensional (3D) maps are disclosed herein. In various implementations, generating and maintaining 3D maps with accurate elevation information is costly and complex. Unmapped areas (e.g., new roads) have varying geometries that can demand manual oversight and annotations, thereby increasing costs. Similarly, map data can become stale and sensor data from a fleet limits accuracy particularly when encountering stacked roads (e.g., overpasses, underpasses, double-decker bridges, ramps, etc.). As such, systems in a vehicle have difficulties performing tasks (e.g., lane tracking) reliably due to insufficient elevation information about lanes. Therefore, in one embodiment, an estimation system infers elevation for driving lanes on two-dimensional (2D) maps without manual annotation using vehicle headings and road geometries in a heuristic model. In particular, the estimation system associates headings with vertices of 2D lines associated with vehicle travel and directionality. In one approach, the estimation system infers elevations of the vertices by computing a weighted average of lane data and vehicle poses (e.g., orientation, 3D position, etc.). The lane data includes information (e.g., position) about surrounding lane boundaries detected from other vehicles having various locations and the weighted average factors directional differences between the vertices. In this way, the estimation system accurately infers elevation by factoring surrounding lane boundaries detected from other vehicles with headings.

In various implementations, the estimation system detects 3D keypoints for line strings associated with the detected lane boundaries and approximates an orientation of the 2D lines accordingly. In this way, the estimation system can infer a road trace (e.g., a sequence of frames for a road segment) for the vehicle from the vehicle poses, the headings, and detected keypoints in 3D. In one approach, the estimation system indicates stacked roads on a 3D map when the road traces between different vehicles are perpendicular (e.g., 90°). Furthermore, the elevation system can adjust elevations by associating the road trace and the detected lane boundaries with 3D data about objects (e.g., street signs, street lights, etc.). Accordingly, the estimation system improves elevation information for driving lanes in a 3D map using lane boundaries, road traces, and headings while reducing complexity and costs.

Figure 1:
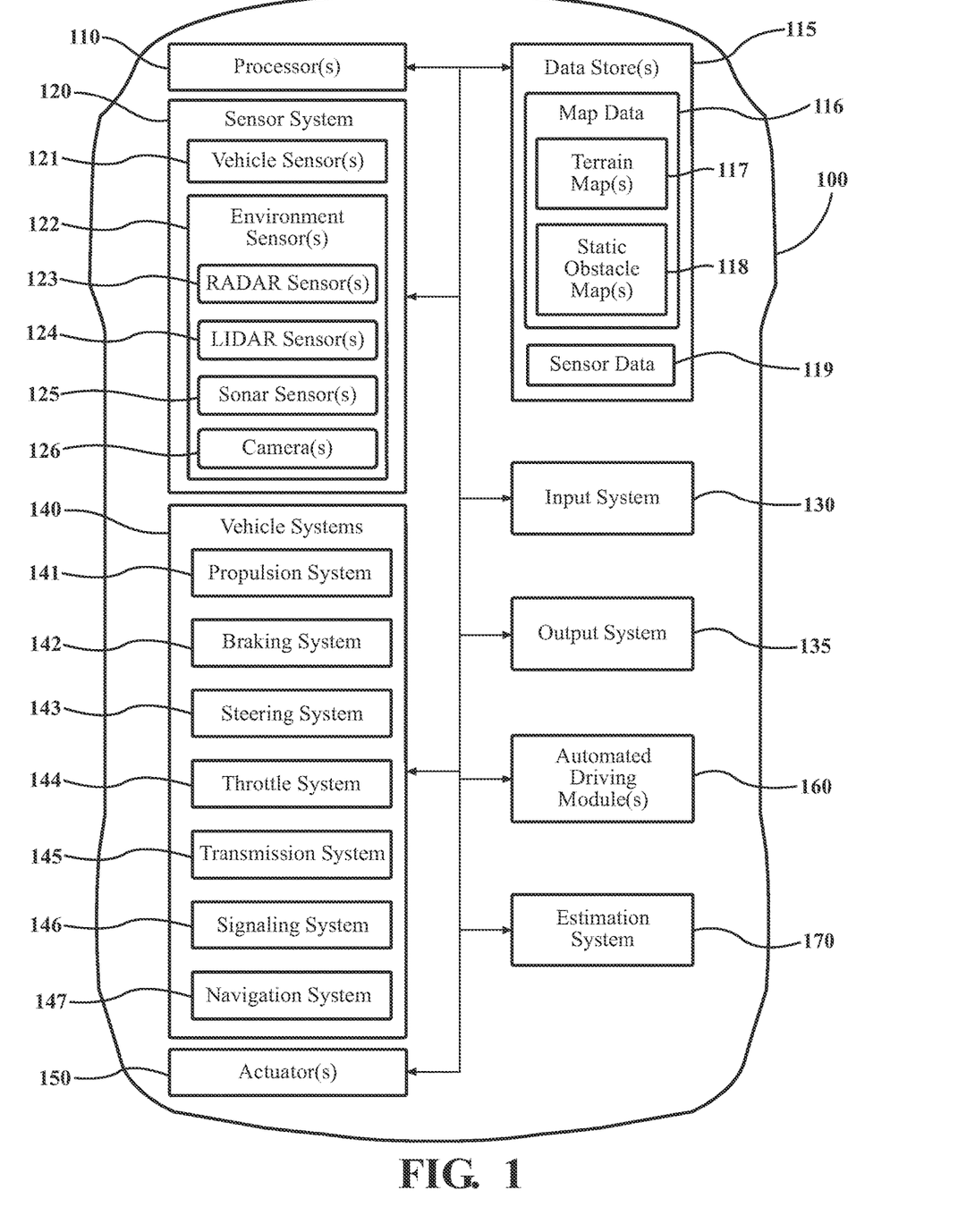
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an estimation system 170 uses road-side units (RSU), consumer electronics (CE), mobile devices, robots, drones, and so on that benefit from the functionality discussed herein associated with estimating lane elevation using headings for generating 3D maps.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an estimation system 170 that is implemented to perform methods and other functions as disclosed herein relating to estimating lane elevation using headings for generating 3D maps. As will be discussed in greater detail subsequently, the estimation system 170, in various embodiments, is implemented partially within the vehicle 100, and as a cloud-based service. For example, in one approach, functionality associated with at least one module of the estimation system 170 is implemented within the vehicle 100 while further functionality is implemented within a cloud-based computing system.

Figure 2:
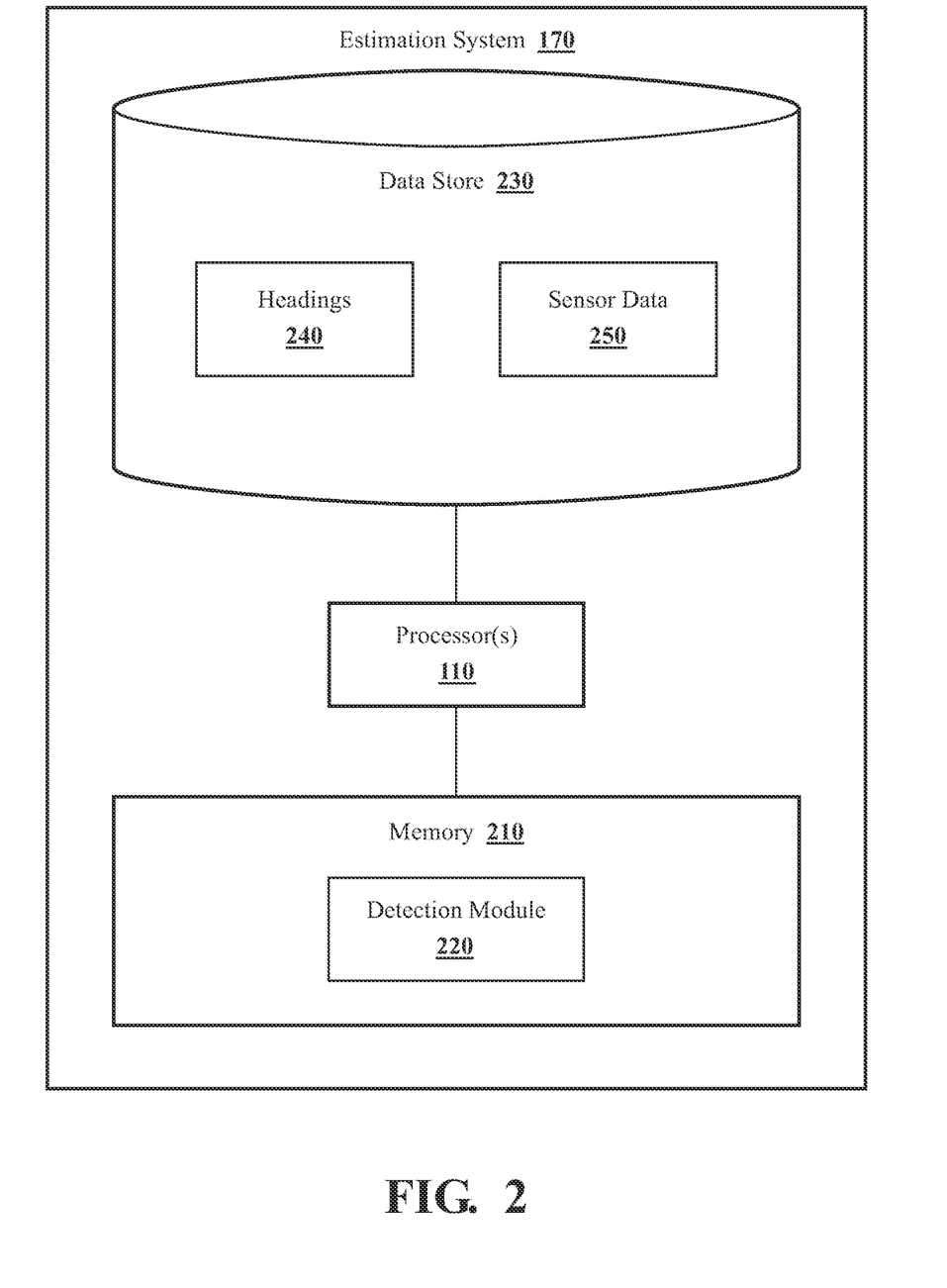
FIG. 2 illustrates one embodiment of an estimation system that is associated with inferring lane elevations using headings for generating maps.

With reference to FIG. 2, one embodiment of the estimation system 170 of FIG. 1 is further illustrated. Although the embodiment implements the estimation system 170 in vehicle 100 for online computations, the estimation system 170 can also be executed offline on a server that generates 3D maps. Online estimations can benefit the vehicle 100 operating in an automated mode that demands high-definition and current map data. Offline estimations benefit from increased computing power than the vehicle 100, thereby improving accuracy and computation speed.

The estimation system 170 is shown as including a processor(s) 110 from the vehicle 100 of FIG. 1. Accordingly, the processor(s) 110 may be a part of the estimation system 170, the estimation system 170 may include a separate processor from the processor(s) 110 of the vehicle 100, or the estimation system 170 may access the processor(s) 110 through a data bus or another communication path. In one embodiment, the estimation system 170 includes a memory 210 that stores a detection module 220. The memory 210 is a random-access memory (RAM), a read-only memory (ROM), a hard-disk drive, a flash memory, or other suitable memory for storing the detection module 220. The detection module 220 is, for example, computer-readable instructions that when executed by the processor(s) 110 cause the processor(s) 110 to perform the various functions disclosed herein.

The estimation system 170 as illustrated in FIG. 2 is generally an abstracted form of the estimation system 170 as may be implemented between the vehicle 100 and a cloud-computing environment or server. Furthermore, the detection module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires the sensor data 250 that includes at least camera images. In further arrangements, the detection module 220 acquires the sensor data 250 from further sensors such as radar sensors 123, LIDAR sensors 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. In addition to locations of surrounding vehicles, the sensor data 250 may also include, for example, information about lane markings, fleet data, and so on. Thus, the sensor data 250, in one embodiment, represents a combination of perceptions acquired from multiple sensors.

Moreover, in one embodiment, the estimation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the detection module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes headings 240 that represents an orientation of a pose on the standard reference ellipsoid for Earth. A heading is an angle relative to north. For example, headings 0°, 90°, 180°, and 270° correspond to an orientation pointing north, east, south, and west, respectively. As explained below, the estimation system 170 can infer elevation accurately by associating detected lane boundaries with headings of vehicles from the sensor data 250 (e.g., fleet data) through online or offline computations.

Figure 3:
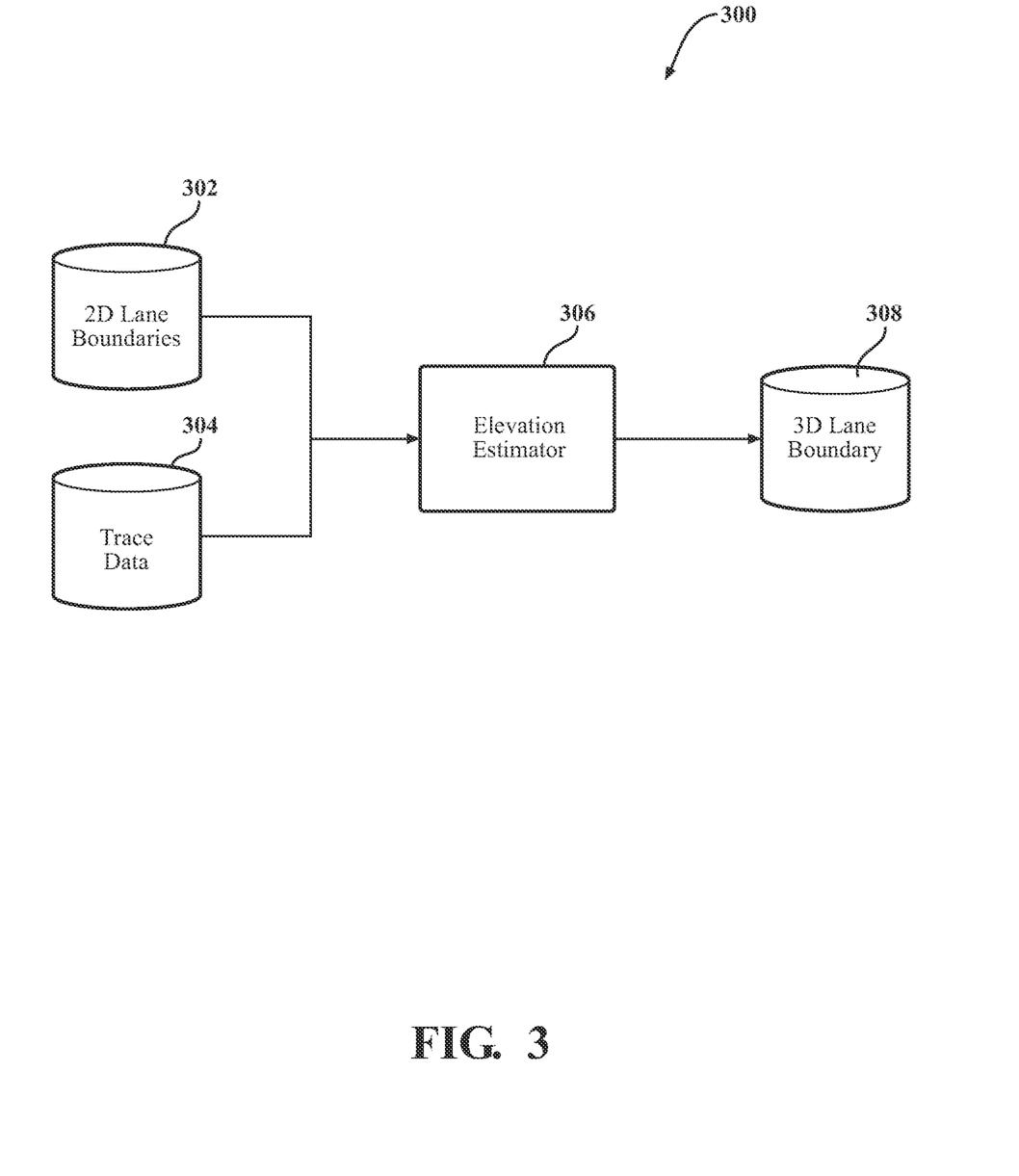
FIG. 3 illustrates one embodiment of the estimation system acquiring data about lane boundaries and traces to infer lane elevations and generate a three-dimensional (3D) map.

Turning now to FIG. 3, one embodiment of the estimation system 170 acquiring data about lane boundaries and road traces to infer lane elevations and generate a 3D map through heuristic modeling is disclosed. As explained below, the estimation system 170 approximates a heading and identifies nearby lane boundaries and poses per vertex of a 2D lane boundary 302 for inferring elevation about detected features and poses. In this regard, the detection module 220 is further configured to perform additional tasks beyond controlling the respective sensors to acquire and provide the sensor data 250. For example, the detection module 220 in system 300 includes instructions that cause the processor 110 to acquire the detected 2D lane boundaries 302 and the trace data 304. Here, the 2D lane boundary may be computed using a physical, a heuristic, or a data-driven model. For example, a machine learning algorithm, such as a convolutional neural network (CNN), performs semantic segmentation over the sensor data 250 from which further information is derived. Of course, in further aspects, the data driven model may employ different machine learning algorithms or implements different approaches for performing the associated functions, which can include deep convolutional encoder-decoder architectures, or another suitable approach that generates semantic labels for the separate object classes represented in the image. These computations are executed by the vehicle 100 for online implementations and a cloud-based service or a server for offline implementations. In other words, the system 300 may be implemented in the vehicle 100 for generating 3D maps online or implemented similarly on a server for offline computations through similar protocols.

In various implementations, the elevation estimator 306 adds elevation to a 2D lane boundary using the trace data 304 without raster data from orthographic images (e.g., aerial photographs, satellite imagery, digital pictures, scanned maps, etc.). The trace data 304 may include altitude, elevation, global positioning system (GPS), headings, orthographic images, and so on data about one or more vehicles 100. The trace data 304 can be organized as a sequence of frames modeling a path (e.g., road trace), object, etc. over time. Such data may also be fleet data acquired from real-world vehicles. In this way, estimated elevation can be implemented within a semantic pipeline of a mapping system or within a post-processing step with minimal manual curation, thereby reducing complexity.

Regarding details on using the trace data 304, a trace can be a sequence of frames such that a frame has a vehicle pose, heading, and associated keypoint detections. The estimation system 170 can organize detected keypoints in a space-partitioning data structure (e.g., a binary tree) for efficient online processing of traces by the vehicle 100. As detected keypoints have spatial position without orientation, the estimation system 170 can approximate the heading of a detected keypoint as that of the vehicle 100. This approximation assumes that the vehicle 100 is aligned parallel to the surrounding lane lines, thereby saving on additional computations.

As explained below, in various implementations, the estimation system 170 infers the elevation of detected line strings about 2D lane boundaries using road traces that include vehicle poses and 3D keypoints. In one approach, the elevation estimator 306 acquires detected keypoints about multiple vehicles nearby for estimating the elevation of a vertex associated with a lane boundary and updating a 3D map. Furthermore, the 3D lane boundary 308 inferred by the elevation estimator 306 factors stacked roads from the detected keypoints. For example, the elevation estimator 306 compares the local alignment and angular differences between the 2D lane boundary and the lane lines that caused the detected keypoints. Accordingly, a mapping pipeline can inject the 3D lane boundary 308 to accurately indicate elevation using headings, road traces, and keypoints, while reducing computation costs.

Figure 4A:
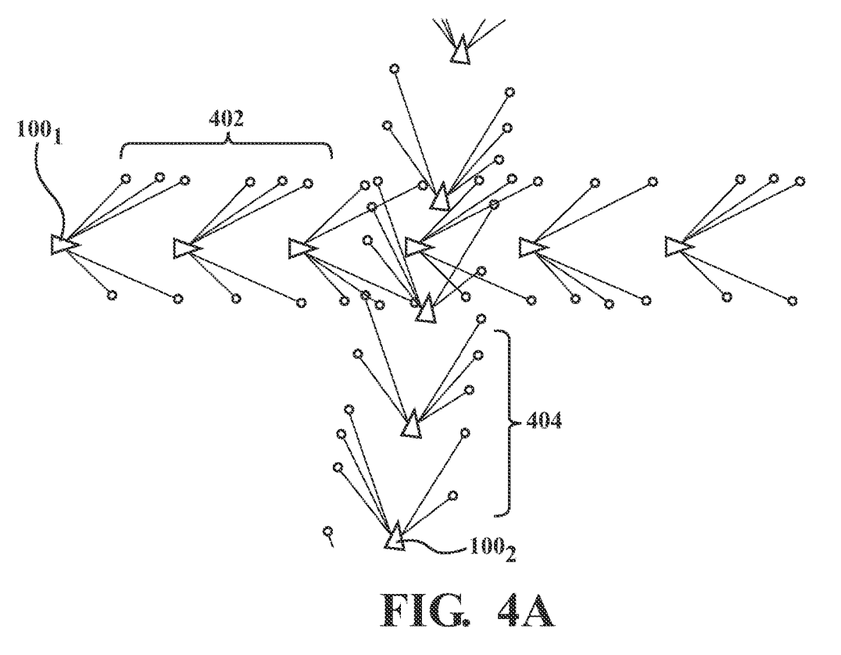
FIGS. 4A-4C illustrate examples of the estimation system inferring lane elevations using headings and vertices associated with two-dimensional (2D) lines.
Figure 4B:
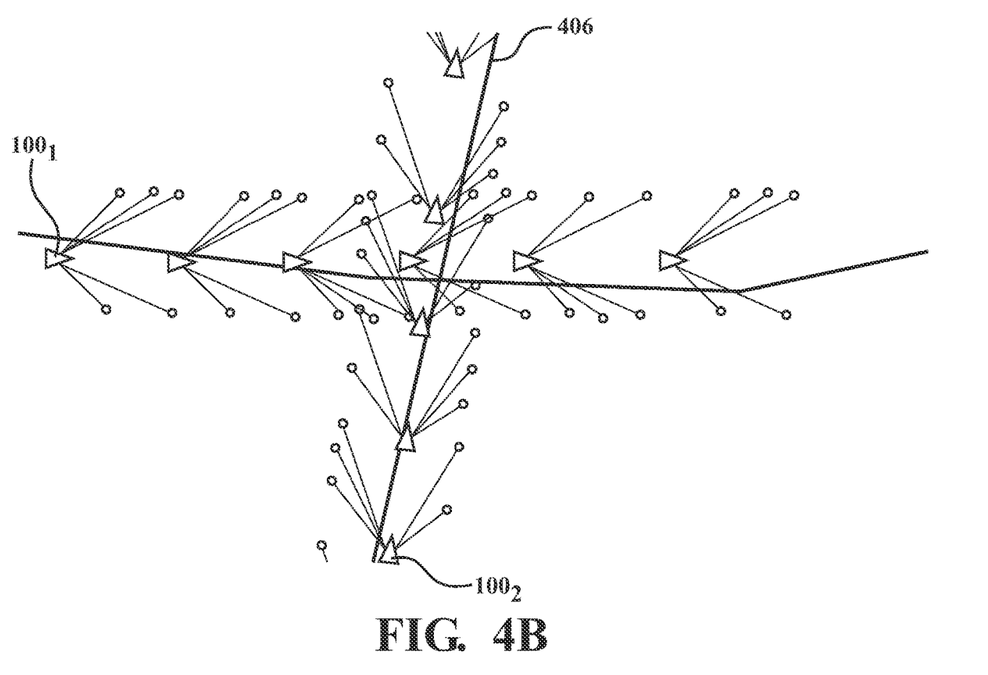
Figure 4C:
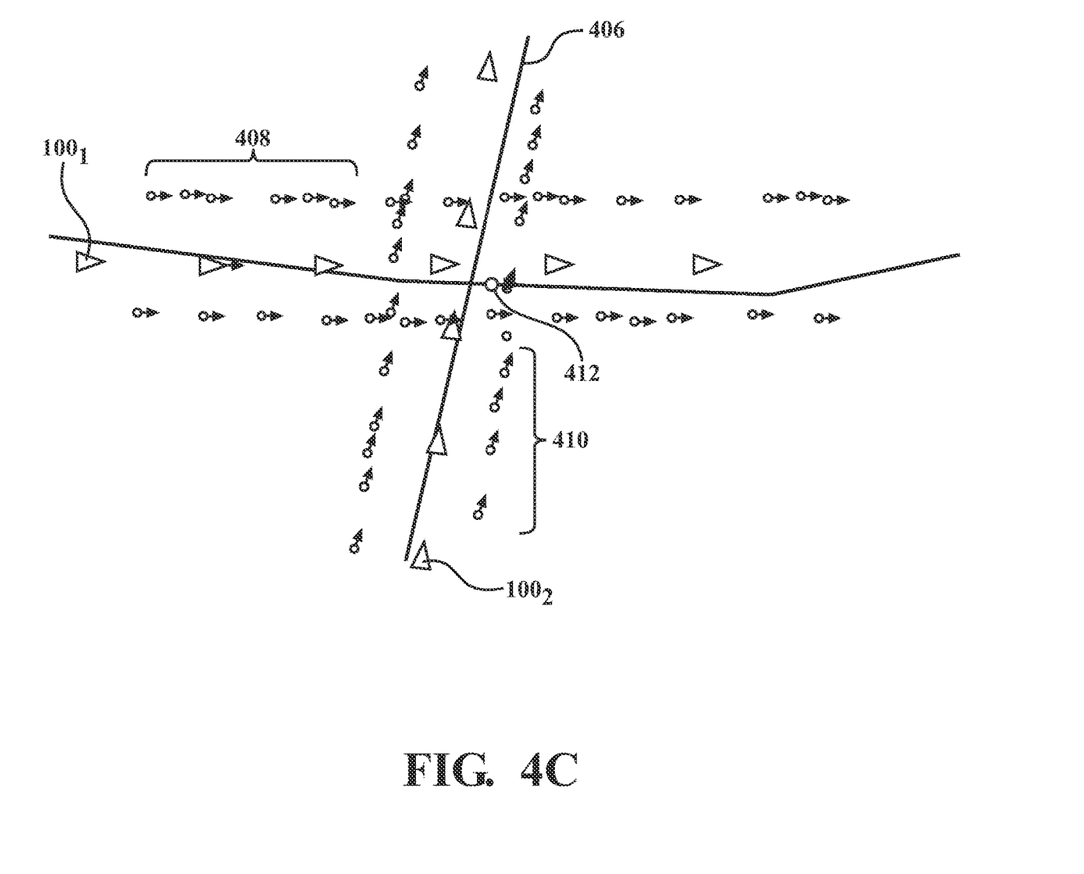

FIGS. 4A-4C illustrate examples of the estimation system 170 inferring lane elevations using headings and vertices associated with 2D lines. FIG. 4A illustrates the inputs to the estimation system 170 from the trace data 304. A vehicle pose 100$_1$ is associated with 3D detections of keypoints 402 about 2D lane boundaries represented as line strings. In one approach, a vehicle pose 100$_1$ is also associated with detected keypoints 402 of objects (e.g. landmarks, road signs, traffic lights, etc.) in 3D that augments elevation estimations. Similarly, a different drive from the trace data 304 includes a vehicle pose 100$_2$ associated with detected keypoints 404 of 2D lane boundaries, objects (e.g. landmarks, road signs, traffic light, etc.), and so on that the estimation system 170 factors.

In FIG. 4A, the observations can be 3D inputs about lane boundaries that are known and the estimation system 170 infers elevation through the headings 240 and the 3D inputs to generate 3D maps. Here, the estimation system 170 augments positions of the detected 2D lane boundaries 302 with headings from vehicles 100, the sensor data 250, and the trace data 304 for inferring elevation about 2D road lines. In one approach, the point-shaped 3D lane boundary detection is augmented with the heading of the vehicle 100 that generates this detection. In another approach, the vehicle pose 100$_1$ is 3D when inferred with elevation information about objects such as traffic lights detected using GPS and keypoints. For example, the estimation system 170 detects a 3D object (e.g. landmarks, road signs, traffic light, etc.), by associating altitude from GPS data. As such, elevation for a driving lane can be inferred from a 3D pose detected using the 3D object. In the case of a speed sign, the estimation system 170 may detect an up ramp with an elevated speed limit and a down ramp with a decreased speed limit. As explained below, the estimation system 170 can combine this information with headings, road traces, and other detections to infer elevation accurately for complex driving tasks downstream.

In FIG. 4B, the estimation system 170 including a 2D road graph 406 to be lifted with elevation is illustrated. A road graph may include edges representing roads that are connected by nodes (e.g., intersections). FIG. 4C illustrates the 2D road graph 406 lifted and output by the estimation system 170. Here, a query point 412 represents an estimation inferred by the estimation system 170 associated with 2D vertices. In one approach, the estimation system 170 adds the headings to vertices of 2D lines associated with the 2D road graph 406 using direction vectors between the vertices. In particular, the 2D lines may be directed towards the detected 2D lane boundaries 302 and the direction vectors selected for those that point to forthcoming vertices. For endpoints, the estimation system 170 can equate the heading of a last node or vertex of a 2D line with previous vertices.

Moreover, the estimation system 170 may compute a weighted average of surrounding lane boundaries 408 and 410 from other vehicles for estimating elevations of the vertices. This includes vehicle poses (e.g., orientation, 3D position, etc.) from the sensor data 250 selected by the estimation system 170 around a search radius (e.g., 10 meters (m), 100 m, etc.) for the query point 412. In one approach, the surrounding lane boundaries 408 and 410 have locations and 3D keypoints different than the positions of detected lane boundaries for the vehicle 100. Here, the weighted average factors directional differences between the vertices of detections from neighbors. For example, an overpass having keypoints and a vehicle pose at 90° heading from a road trace and within a 10 m radius of the vehicle pose 100$_1$ is irrelevant and given a zero weight. In other words, the road trace being substantially perpendicular with another road trace may be irrelevant for the estimation system 170 inferring elevation, especially beyond a certain radius. However, a heading substantially aligned with the query point 412 is given a relevant weight and averaged with other heading values for elevation estimations.

In various implementations, the weights are a difference in heading using a cosine function:

$$w = |\cos(\alpha - \beta)|. \quad \text{Equation (1)}$$

Here, w denotes the weight of a keypoint and α and β are the heading angles of the node/vertex and keypoint, respectively. As such, weighting can factor differences between angles of the headings and keypoints associated with detected lane boundaries and surrounding lane boundaries. In this way, the estimation system 170 detects stacked roads accurately through aligning trace data. Otherwise, an underpass may be erroneously identified as an overpass when the estimation system 170 factors misaligned heading information and improper weighting of keypoints. Accordingly, the estimation system 170 accurately generates a 3D map of driving lanes, including those with stacked roads, using the elevations.

As previously explained, the estimation system 170 can improve elevation accuracy using 3D object detection. For example, the estimation system 170 selects trace data associated with a landmark TYPE for a keypoint that improves differentiating between road layers through factoring landmark features. In this way, the estimation system 170 relies on data other than headings for weighing surrounding detections and vehicle poses. Besides landmark types, the estimation system 170 can factor other dimensions surrounding the query point 412 such as speed limit, a number of lanes, lane widths, trajectory curvature, grade, and so on for a road. Dimensions for conditions such as vehicle speed, vehicle vibration, road bumpiness, road surface type, scene brightness (e.g., tunnel, surface, etc.), weather (e.g., precipitation), and so on can also improve weight computations, thereby improving elevation accuracy. For example, the estimation system 170 weights vehicle poses within the radius of the query point 412 associated with data from a rough road less than a vehicle pose nearby associated with a bright scene. In this way, the estimation system 170 adjusts inferred elevations using estimated 3D data associated with a road trace and detected lane boundaries.

Figure 5:
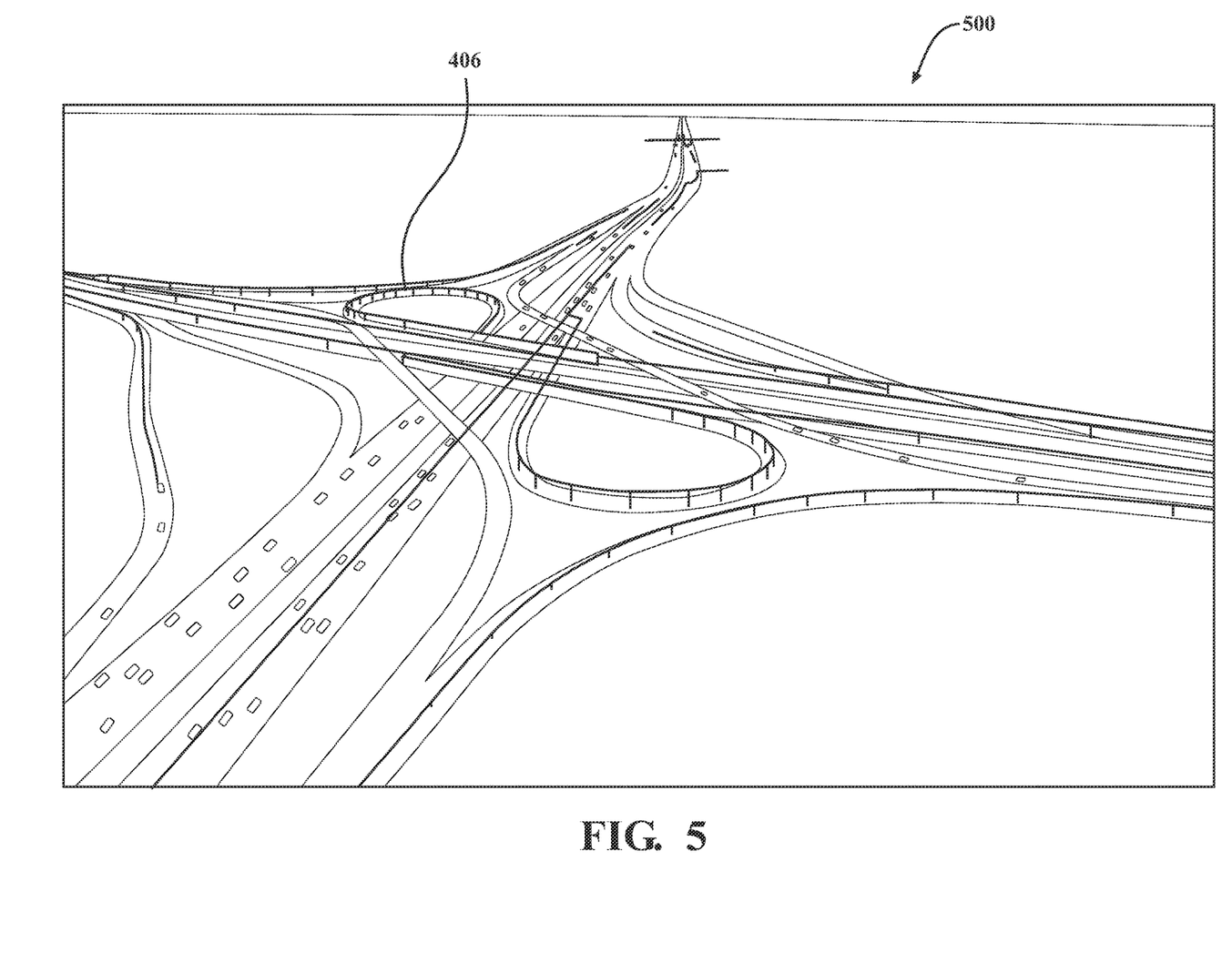
FIG. 5 illustrates an example of a 3D map generated by the estimation system.

FIG. 5 illustrates an example of a 3D map 500 generated by the estimation system 170. Here, the estimation system 170 lifts the 2D road graph 406 using estimated elevations. The estimation system 170 can lift the 2D road graph 406 online or offline for generating 3D maps. As previously explained, online estimations can benefit the vehicle 100 having the automated driving module (ADM) 160 executing tasks that demand high-definition and current map data. Offline estimations benefit from increased computing power than the vehicle 100, thereby improving accuracy and computation speed. As previously explained, the estimation system 170 may also compute a weighted average of surrounding lane boundaries from other vehicles that traveled on the roads (e.g., fleet data). This includes vehicle poses from the sensor data 250 selected by the estimation system 170 around a search radius for the query points. In this way, the estimation system 170 accurately infers elevation of roads using the 2D lane boundaries and the trace data 304.

Figure 6:
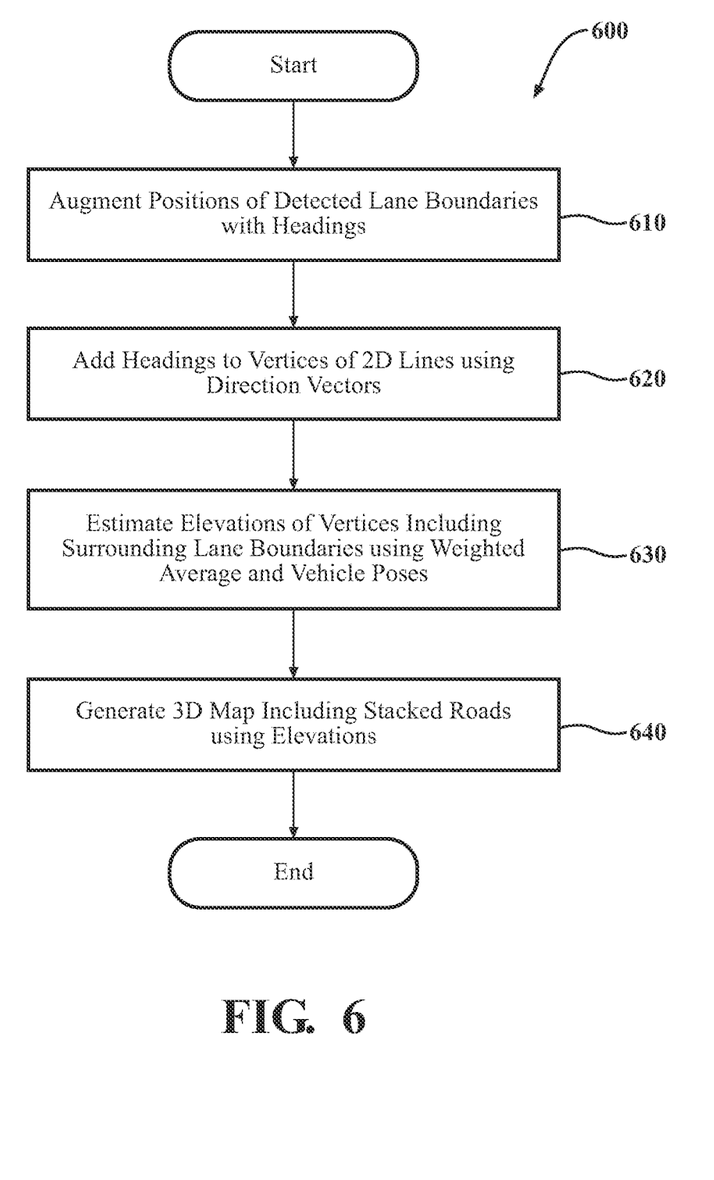
FIG. 6 illustrates one embodiment of a method that is associated with estimating lane elevations using headings, line vertices, and generating a 3D map.

Now turning to FIG. 6, one embodiment of a method that is associated with estimating lane elevations using headings and generating a 3D map is illustrated. FIG. 6 illustrates a flowchart of a method 600 that is associated with estimating lane elevation using headings for generating 3D maps. Method 600 will be discussed from the perspective of the estimation system 170 of FIGS. 1 and 2. While method 600 is discussed in combination with the estimation system 170, it should be appreciated that the method 600 is not limited to being implemented within the estimation system 170 but is instead one example of a system that may implement the method 600. Furthermore, the estimation system 170 may operate online in the vehicle 100 or offline on a server. As previously explained, online estimations benefit the vehicle 100 operating in an automated mode that demands high-definition and accurate map data. On the contrary, offline estimations benefit from increased computing power than the vehicle 100, thereby improving accuracy and computation speed.

At 610, the estimation system 170 and detection module 220 augment positions of detected lane boundaries with headings. In particular, the headings may be acquired from the trace data 304 by a server offline or the vehicle 100 online. Here, the headings represent an orientation of a pose on the standard reference ellipsoid for Earth associated with the vehicle 100. A heading is an angle relative to north. For example, headings 0°, 90°, 180°, and 270° heading correspond to an orientation pointing north, east, south, and west, respectively. As explained below, the estimation system 170 can infer elevation accurately by associating detected lane boundaries with headings of vehicles such that the headings are associated with the detected keypoints for an object or lane boundary. Furthermore, the detected lane boundaries may be the detected 2D lane boundaries 302. As previously explained, the 2D lane boundaries 302 can be computed using a physical, heuristic, or data-driven model. For example, a machine learning algorithm, such as a convolutional neural network (CNN), performs semantic segmentation over sensor data (e.g., image) from which further information is derived by the estimation system 170.

At 620, the estimation system 170 add headings to vertices of 2D lines using direction vectors. Here, the estimation system 170 may select a heading by factoring the direction vectors such that two vertices are adjacent points in similar directions (e.g., N to NE, S to SE, etc.). In this way, the estimation system 170 reliably identifies a 2D line for lifting into 3D from the vertices forming a trajectory for one or more of the vehicles 100.

At 630, the estimation system 170 infers elevations of the vertices for a 2D line including surrounding lane boundaries using a weighted average and vehicle poses (e.g., orientation, 3D position, etc.). Here, the surrounding lane boundaries having locations different than the positions of the detection lane boundaries. The weighted average computations factor directional differences between the vertices and positions. Furthermore, the surrounding lane boundaries may be within a search radius (e.g., 10 m, 100 m, etc.) such that the estimation system 170 factors data that increases the precision of elevation estimates while discarding erroneous data. As previously explained, the weights can factor a Euclidean distance between the vertices and heading alignment having defined keypoints for a 2D lane boundary within a 3D space. In one approach, the estimation system 170 gives more weight for lessor Euclidean and angular distances. For example, the estimation system 170 weights directional differences being within ninety degrees and discarding values for the directional differences above ninety degrees. Accordingly, the estimation system 170 weights relevant headings with keypoints and vertices for increasing the accuracy of elevation estimates.

In various implementations, the estimation system 170 approximates an orientation of the 2D lines with detected 3D keypoints that the headings are associated with for the vehicle 100. The estimation system 170 infers a road trace for the vehicle 100 from the vehicle poses, the headings, and detected keypoints having line strings associated with the detected lane boundaries and the 2D lines. Here, the vehicle poses and the detected keypoints may indicate frames of the road trace. In one approach, the estimation system 170 indicates stacked roads on a 3D map from the road trace being substantially perpendicular with another road trace. For example, a road trace on an overpass is perpendicular to a road trace underneath the overpass. Accordingly, road traces can improve generating maps with complex geometries and paths through contextual inferences.

At 640, the estimation system 170 generates a 3D map of driving lanes having stacked (e.g., roads identified using the elevations. Returning to FIG. 5, a 3D map 500 includes complex interchanges and off-ramps having various elevations that the estimation system 170 infers with increased accuracy using headings. Furthermore, as explained above, the estimation system 170 can adjust the elevations using estimated 3D data about objects associated with the road trace and the detected lane boundaries. For example, the estimation system 170 associates road signs detected with 3D keypoints with GPS information. As such, the elevation value is adjusted when a vertex is proximate to the road sign using the GPS information (e.g., altitude).

In various implementations, the estimation system 170 selects the trace data 304 associated with TYPE for a keypoint and differentiates between road layers accordingly. In this way, the estimation system 170 relies on data other than headings and the vertices for weighing surrounding detections and vehicle poses. For example, the estimation system 170 factors dimensions surrounding a query point such as speed limit, a number of lanes, lane widths, trajectory curvature, grade, landmarks, and so on for a road. Dimensions for conditions such as vehicle speed, vehicle vibration, road bumpiness, road surface type, scene brightness (e.g., tunnel, surface, etc.), weather (e.g., precipitation), and so on can also improve weight computations, thereby increasing elevation accuracy. For instance, the estimation system 170 weights multiple vehicle poses within the radius of the query point 412 associated with data from a rough road less than a vehicle pose nearby associated with a bright scene. Accordingly, the estimation system 170 adjusts inferred elevations using estimated 3D data associated with a road trace and detected lane boundaries, thereby increasing accuracy and reliability for driving tasks.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the estimation system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the estimation system 170, and/or the automated driving module(s) 160 can be operatively connected to communicate with the various vehicle systems 140 and/or individual components thereof. For example, the processor(s) 110, the estimation system 170, and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140.

The processor(s) 110, the estimation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the estimation system 170, and/or the automated driving module(s) 160 can control the direction and/or speed of the vehicle 100. The processor(s) 110, the estimation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:
a memory storing instructions that, when executed by a processor, cause the processor to:
augment first positions of detected lane boundaries with headings of a vehicle from sensor data;
add the headings to vertices of two-dimensional (2D) lines using direction vectors between the vertices, wherein the 2D lines are directed towards the detected lane boundaries;
estimate elevations of the vertices including surrounding lane boundaries using a weighted average and vehicle poses from the sensor data, the surrounding lane boundaries are at second positions and the weighted average includes factoring directional differences between the vertices; and
generate a three-dimensional (3D) map of driving lanes having stacked roads identified using the elevations.

2. The estimation system of claim 1 further including instructions to:
approximate an orientation of the 2D lines with detected keypoints in 3D, wherein the headings are associated with the detected keypoints for the vehicle; and
infer a road trace for the vehicle from the vehicle poses, the headings, the detected keypoints that have line strings associated with the detected lane boundaries, and the 2D lines, wherein the vehicle poses and the detected keypoints indicate frames of the road trace.

3. The estimation system of claim 2 further including instructions to indicate the stacked roads on the 3D map according to the road trace being substantially perpendicular with another road trace within a search radius.

4. The estimation system of claim 2, wherein the instructions to estimate the elevations further include instructions to adjust the elevations using estimated 3D data about objects associated with the road trace and the detected lane boundaries.

5. The estimation system of claim 2 further including instructions to compute the 3D map by associating objects with global positioning system (GPS) information, wherein the objects are landmarks.

6. The estimation system of claim 1, wherein the instructions to estimate the elevations further include instructions to compute the weighted average by applying weights according to differences between angles of the headings and keypoints associated with the detected lane boundaries and the surrounding lane boundaries.

7. The estimation system of claim 1, wherein the instructions to estimate the elevations further include instructions to:
acquire the sensor data by a server from fleet data; and
locate the stacked roads offline for the 3D map from the fleet data.

8. The estimation system of claim 1, wherein the instructions to estimate the elevations further include instructions to compute the weighted average for the directional differences being within ninety degrees and discarding values for the directional differences above ninety degrees within a search radius.

9. The estimation system of claim 1 further including instructions to approximate an orientation of the 2D lines with detected keypoints, wherein the headings are associated with the detected keypoints in 3D for the vehicle.

10. A non-transitory computer-readable medium comprising:
instructions that when executed by a processor cause the processor to:
augment first positions of detected lane boundaries with headings of a vehicle from sensor data;
add the headings to vertices of two-dimensional (2D) lines using direction vectors between the vertices, wherein the 2D lines are directed towards the detected lane boundaries;
estimate elevations of the vertices including surrounding lane boundaries using a weighted average and using vehicle poses from the sensor data, the surrounding lane boundaries are at second positions and the weighted average includes factoring directional differences between the vertices; and generate a three-dimensional (3D) map of driving lanes having stacked roads identified using the elevations.

11. A method comprising:

augmenting first positions of detected lane boundaries with headings of a vehicle from sensor data;

adding the headings to vertices of two-dimensional (2D) lines using direction vectors between the vertices, wherein the 2D lines are directed towards the detected lane boundaries;

estimating elevations of the vertices including surrounding lane boundaries using a weighted average and vehicle poses from the sensor data, the surrounding lane boundaries are at second positions and the weighted average includes factoring directional differences between the vertices; and generating a three-dimensional (3D) map of driving lanes having stacked roads identified using the elevations.

12. The method of claim 11 further comprising:

approximating an orientation of the 2D lines with detected keypoints in 3D, wherein the headings are associated with the detected keypoints for the vehicle; and inferring a road trace for the vehicle from the vehicle poses, the headings, the detected keypoints that have line strings associated with the detected lane boundaries and the 2D lines, wherein the vehicle poses and the detected keypoints indicate frames of the road trace.

13. The method of claim 12 further comprising indicating the stacked roads on the 3D map according to the road trace being substantially perpendicular with another road trace within a search radius.

14. The method of claim 12, wherein estimating the elevations further includes adjusting the elevations using estimated 3D data about objects associated with the road trace and the detected lane boundaries.

15. The method of claim 12 further comprising computing the 3D map by associating objects with global positioning system (GPS) information, wherein the objects are landmarks.

16. The method of claim 11, wherein estimating the elevations further includes computing the weighted average by applying weights according to differences between angles of the headings and keypoints associated with the detected lane boundaries and the surrounding lane boundaries.

17. The method of claim 11, wherein estimating the elevations further includes:

acquiring the sensor data by a server from fleet data; and locating the stacked roads offline for the 3D map from the fleet data.

18. The method of claim 11, wherein estimating the elevations further includes:

acquiring the sensor data by a vehicle from fleet data over a network; and locating the stacked roads online for the 3D map from the fleet data.

19. The method of claim 11, wherein estimating the elevations further includes computing the weighted average for the directional differences being within ninety degrees and discarding values for the directional differences above ninety degrees within a search radius.

20. The method of claim 11 further comprising approximating an orientation of the 2D lines with detected keypoints, wherein the headings are associated with the detected keypoints in 3D for the vehicle.

* * * * *